United States Patent [19]
Hatfield

[11] 3,881,870
[45] May 6, 1975

[54] EFFLUENT CONTROL APPARATUS

[76] Inventor: Lonnie P. Hatfield, P.O. Box 237, Oklahoma City, Okla. 73101

[22] Filed: July 13, 1973

[21] Appl. No.: 378,983

[52] U.S. Cl. ............ 23/277 C; 55/521; 55/DIG. 30; 55/DIG. 20; 110/8 A; 110/8 R; 110/119
[51] Int. Cl. ............................ F23c 9/04; F23g 7/06
[58] Field of Search ........ 23/277 C, 288 P; 55/521, 55/DIG. 30, DIG. 20; 110/8 A, 8 R, 119; 432/223, 72

[56] References Cited
UNITED STATES PATENTS

| | | | |
|---|---|---|---|
| 233,022 | 10/1880 | Ridley | 55/521 |
| 2,996,143 | 8/1961 | Beasleg | 23/277 C |
| 3,408,167 | 10/1968 | Burden, Jr. | 23/277 C |
| 3,650,111 | 3/1972 | Reichhelm | 23/277 C |

*Primary Examiner*—James H. Tayman, Jr.
*Attorney, Agent, or Firm*—Dunlap & Codding

[57] ABSTRACT

An effluent control apparatus for receiving an effluent contaminated with a pollutant and reducing the pollutant content of the effluent discharged from the effluent control apparatus wherein the contaminated effluent is moved through a firing chamber maintained at a predetermined temperature level via a burner assembly, the contaminated effluent mixing with air and being heated to a predetermined temperature level generally within the firing chamber for combusting the combustible pollutant components contained in the contaminated effluent. Air is forced through an air inlet passageway and discharged in a direction generally parallel with the direction of flow of the effluent through the effluent control apparatus cooperatively pulling the effluent through the effluent control apparatus and enhancing the combustion of the combustible pollutant components within the firing chamber. A baffle having baffle openings is disposed within a portion of the firing chamber and heated to a predetermined temperature level, the baffle reducing the velocity of the effluent flow through the firing chamber and intimately contacting a portion of the effluent, the heated baffle cooperating to maintain the predetermined temperature level within the firing chamber.

9 Claims, 6 Drawing Figures

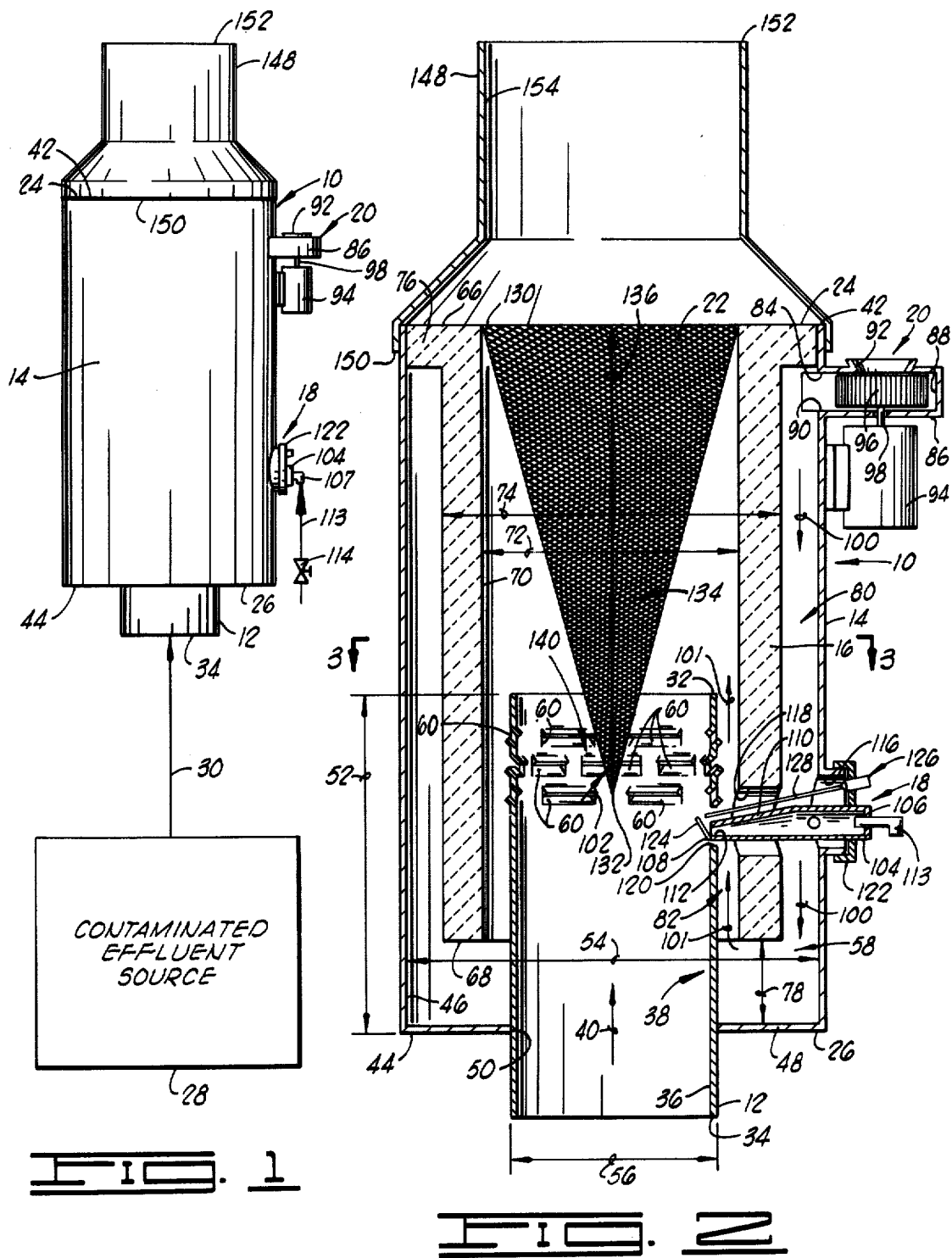

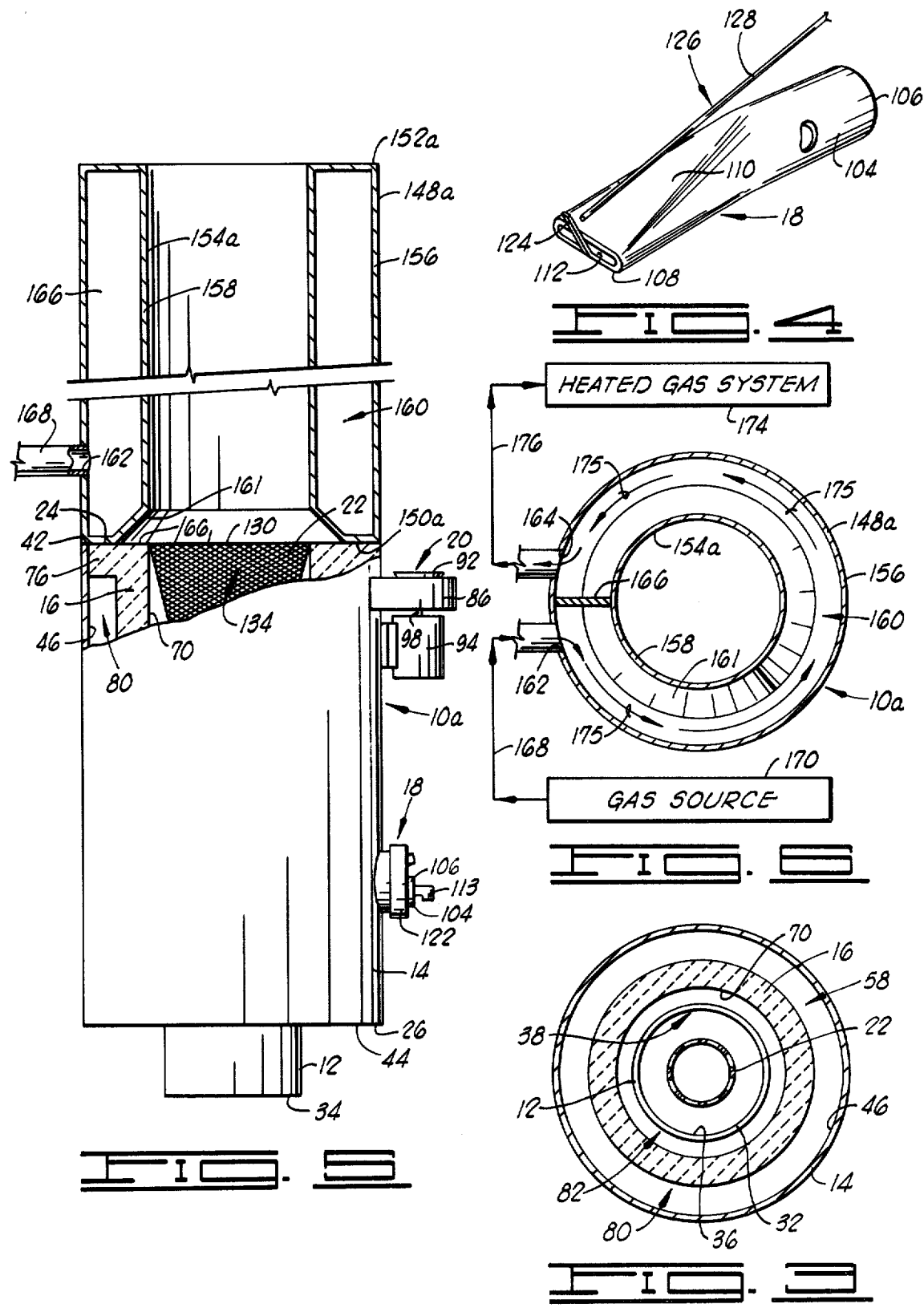

EFFLUENT CONTROL APPARATUS

BACKGROUND OF THE INVENTION

1. Field of the Invention

This invention relates generally to improvements in effluent control devices and, more particularly, but not by way of limitation, to an effluent control apparatus for reducing the pollutant content of a contaminated effluent moving therethrough.

2. Brief Description of the Prior Art

In the past various devices have been constructed in an attempt to reduce the pollutant content of a contaminated effluent produced via a contaminated effluent source such as an incinerator or waste treatment plant or the like. Some of the devices have inclded an apparatus for burning fuel and moving the effluent into contact with the burning fuel for combustion of the combustible pollutant components such as the apparatus disclosed in the United States Patent No. issued to Hardison, 3,484,189, for example.

The McCrocklin U.S. Pat., No. 3,603,080, disclosed an incinerator having a contaminated air inlet disposed generally adjacent a burner section wherein the contaminated air was contacted and heated via the burner section, the incinerator of the McCrocklin Patent being constructed for discharging "clean" air therefrom. The incinerator of the McCrocklin Patent included an inner and an outer housing forming a combined muffler and emission control type of apparatus having a baffled outer periphery. One other similar type of device which has been proposed in the past was disclosed in the U.S. Pat., No. 3,603,081, issued to McCrocklin.

An afterburner type of apparatus was disclosed in the U.S. Pat. No. 3,658,482, issued to Evans, wherein air was pumped into a baffled arrangement, moved around the outer periphery of the afterburner, forced downwardly and into contact with the air in a heated air chamber, and the air was subsequently discharged through the afterburner stack. Other incinerator type devices proposed in the past were disclosed in the U.S. Pat. Nos. 1,653,574, issued to Kener; 3,337,455, issued to Wilson; and 2,711,139, issued to Martin. The U.S. Pat. No. 3,435,613, issued to Eannarino, disclosed an afterburner apparatus and the U.S. Pat. No. 2,985,255, issued to Clark, disclosed an afterburner type of apparatus wherein the contaminated air was mixed and directed across a baffled burner plate for subsequent discharge from the afterburner. The U.S. Pat. No. 1,839,879, issued to Hyatt, disclosed an afterburner wherein the contaminated air was forced through a baffled plate heated via a burner assembly. Other afterburner types of apparatus proposed in the past were disclosed in the U.S. Pat. Nos.: 2,996,143, issued to Beasley; and 3,606,611, issued to Wright.

SUMMARY OF THE INVENTION

An object of the invention is to increase the efficiency of an effluent control apparatus for reducing the pollutant content within an effluent discharged therethrough.

Another object of the invention is to provide an effluent control apparatus wherein the contaminated effluent is mixed with air in the firing chamber in a more efficient and economical manner.

One other object of the invention is to provide an effluent control apparatus wherein the retention time of the contaminated effluent within the firing chamber is increased.

A further object of the invention is to provide an effluent control apparatus wherein a baffle is interposed in the effluent passageway and within a portion of the firing chamber for increasing the efficiency of combustion of the combustible components of the effluent and for augmentingly maintaining the predetermined temperature level within the firing chamber.

Another object of the invention is to provide an effluent control apparatus which is economical in the construction and the operation thereof.

Other objects and advantages of the invention will be evident from the following detailed description when read in conjunction with the accompanying drawings which illustrate the various embodiments of the invention.

BRIEF DESCRIPTION OF THE DRAWINGS

FIG. 1 is a side elevational view of an effluent control apparatus constructed in accordance with the present invention.

FIG. 2 is a sectional view of the effluent control apparatus of FIG. 1.

FIG. 3 is a sectional view of the effluent control apparatus of FIG. 1, taken substantially along the lines 3—3 of FIG. 1.

FIG. 4 is an enlarged diagrammatical view of a portion of the burner assembly of the effluent control apparatus of FIGS. 1 and 2.

FIG. 5 is a fragmentary, sectional view of a modified effluent control apparatus, similar to the effluent control apparatus shown in FIGS. 1, 2, 3 and 4.

FIG. 6 is a partial sectional, partial diagrammatical view of the modified effluent control apparatus of FIG. 5.

BRIEF DESCRIPTION OF THE PREFERRED EMBODIMENTS

Referring to the drawings in general and to FIGS. 1, 2, 3 and 4 in particular, shown therein and designated via the general reference numeral 10 is an effluent control apparatus basically comprising an inlet conduit 12, an outer casing 14, an inner liner 16, a burner assembly 18, a blower assembly 20 and a baffle 22. The effluent control apparatus 10 has an upper end 24, which may be connected to a discharge stack (one embodiment of the effluent control apparatus of the present invention being shown in FIG. 4 connected to a particular discharge stack in a manner and for reasons which will be described in greater detail below), and a lower end 26 connected to a contaminated effluent source 28 via a conduit 30.

The conduit 30 is, more particularly, connected to the contaminated effluent source 28 such that substantially all or a predetermined portion of the contaminated effluent is received via the conduit 30 and connected to the lower end 26 of the effluent control apparatus 10, the contaminated effluent being discharged into the effluent control apparatus 10 generally at the lower end 26 thereof via the conduit 30. In various operational embodiments of the present invention the effluent control apparatus 10 is connectable to a contaminated effluent source 28 of the type generally referred to as a refuse burning incinerator or a furnace type apparatus wherein refuse is initially disposed and burned, the exhaust effluent or a predetermined portion of the exhaust effluent being connected and discharged into the lower end 26 of the effluent control apparatus 10. In one other operational embodiment of the present invention, the effluent control apparatus 10 is connected to a contaminated effluent source 28 of the type generally referred to as a "smoke house" wherein various food products are retained and smoked for flavoring, the contaminated effluent of the "smoke house" type of contaminated effluent source 28 being connected to the lower end 26 of the effluent control apparatus 10 via the conduit 30. It should be noted that in some other operational applications utilizing the effluent control apparatus 10 of the present invention, more than one contaminated effluent source 28, such as two or more refuse burning incinerators, for example, can be connected to the conduit 30 and the discharged contaminated effluent from each of the contaminated effluent sources 28 is then discharged through the lower end 26 of the effluent control apparatus 10 via the interconnecting conduit 30 depending upon the size and effluent capacity handling capability of the apparatus in any particular application. In yet another operational embodiment, the effluent control apparatus 10 can be connected to receive exhaust gases or process fumes and vapors or the like such as discharged via a sewage treatment plant, the effluent control apparatus 10 functioning to remove the combustible materials from the exhaust gases or process fumes and vapors in a manner which will be made more apparent below.

The contaminated effluent source 28, diagrammatically shown in FIG. 1, represents a source such as an incinerator or other refuse burning device or other such apparatus producing exhaust gases or process fumes and vapors containing combustible waste products or pollutants and the effluent control apparatus 10 is particularly constructed to receive the contaminated effluent and remove a substantially large percentage of the combustible materials or pollutants as the contaminated effluent is moved through the effluent control apparatus 10. It should be particularly noted that the above examples of various contaminated effluent sources 28 are not exhaustive and the effluent control apparatus of the present invention can be utilized in cooperation with various other contaminated effluent sources and in various other operational embodiments in a manner which will become more apparent to those skilled in the art via the detailed description of the effluent control apparatus.

As shown more clearly in FIGS. 2 and 3, the inlet conduit 12 is generally cylindrically shaped and has an upper end 32 and a lower end 34. An opening 36 is formed through the inlet conduit 12 intersecting the upper and the lower ends 32 and 34 and forming an effluent inlet passageway 38 extending through the inlet conduit 12. The inlet conduit 12 is connected to the conduit 30 and positioned such that the effluent inlet passageway 38 is in communication with the contaminated effluent source 38, the contaminated effluent being discharged from the contaminated effluent source 28 into the effluent inlet passageway 38 and moved generally from the lower end 34 toward the upper end 32 of the inlet conduit 12 in the general direction 40 through the effluent inlet passageway 38 during the operation of the effluent control apparatus 10.

The outer casing 14 is generally cylindrically shaped and has an upper end 42 and a lower end 44, an opening 46 being formed through the outer casing 14 extending generally between and intersecting the upper and the lower ends 42 and 44. A plate 48 is secured to the lower end 44 of the outer casing 14, the plate substantially encompassing and enclosing the opening 46 at the lower end 44. An opening 50 is formed through a central portion of the plate 48, the opening 50 being sized to receive a portion of the inlet conduit 12. More particularly, the upper end 32 portion of the inlet conduit 12 is disposed through the opening 50 to a position wherein the upper end 32 of the inlet conduit 12 is disposed generally between the upper and the lower ends 42 and 44 of the outer casing 14, the upper end 32 being disposed a predetermined distance 52 generally above the lower end 44 of the outer casing 14, as shown in FIG. 2.

The opening 46 through the outer casing 14 forms an inner peripheral surface extending about the outer casing 14 having a predetermined casing diameter 54. The inlet conduit 12 has a predetermined outside diameter 56 which is less than the inside casing diameter 54 thereby providing an annular space 58 between the outer peripheral surface of the portion of the inlet conduit 12 disposed within the opening 46 of the outer casing 14 and the inner peripheral surface formed in the outer casing 14 via the opening 46 extending therethrough, for reasons which will be made more apparent below.

It should also be noted that the upper end 32 of the inlet conduit 12 is disposed a predetermined distance below the upper end 24 of the outer casing 14 in an assembled position of the inlet conduit 12 securedly positioned within the opening 46 of the outer casing 14. As shown in FIG. 2, three rows of slots 60 are formed through the inlet conduit 12 spaced a distance generally below the upper end 32, each row of slots 60 being spaced annularly about the inlet conduit 12 and providing a communicating path between the effluent inlet passageway 38 and the annular space 58. More particularly, each of the slots 60 includes a lower lip portion 62 formed at an angle extending generally angularly outwardly into a portion of the annular space 58, and an upper lip portion 64 formed at an angle and extending angularly inwardly into a portion of the effluent inlet passageway 38 (only the upper and the lower lip portions 62 and 64 of one of the slots 60 being designated via reference numerals in FIG. 2 for the purpose of clarity of description and it being specifically understood that the remaining baffled openings 60 are each similarly constructed and include the upper and the lower lip portions 62 and 64).

In a preferred form, the inner liner 16 is constructed of a relatively high-temperature refractory material such as commonly utilized in the construction of furnaces or incinerators or the like, the inner liner 16 being generally cylindrically shaped and having an upper end 66 and a lower end 68. An opening 70 is formed through a central portion of the inner liner 16 intersecting the upper and the lower ends 66 and 68 forming an inner peripheral surface extending about the inner liner 16 having a predetermined diameter 72. As shown in FIGS. 2 and 3, the inner liner 16 has an outer peripheral surface having a predetermined diameter 74. A flange portion 76 is formed on the upper end 66 of the inner liner 16, the flange portion 76 extending a predetermined distance radially outwardly from the outer peripheral surface of the inner liner 16 and extending generally circumferentially about the upper end 66 of the inner liner 16.

In an assembled position of the effluent control apparatus 10, the inner liner 16 is disposed within a portion of the opening 46 in the outer casing 14 and positioned such that the upper end 66 of the inner liner 16 is generally coplanar with the upper end 42 of the outer casing 14 and the lower end 68 of the inner liner 16 is disposed a predetermined distance 78 generally above the lower end 44 of the outer casing 14 or, in other words, generally above the plate 48. In this position of the inner liner 16 within the opening 46 of the outer casing 14, the outer peripheral surface formed via the flange portion 76 is secured to a portion of the inner peripheral wall of the outer casing 14 formed via the opening 46, thereby securedly connecting the inner liner 16 to the outer casing 14.

The diameter 74 formed via the outer peripheral surface of the inner liner 16 is less than the casing diameter 54 formed via the opening 46 in the outer casing 14 and the inner diameter 72 formed via the opening 70 through the inner liner 16 is greater than the outside diameter 56 of the inlet conduit 12. The lower end 68 of the inner liner 16 is, more particularly, disposed within a portion of the annular space 58 thereby interposing a portion of the inner liner 16 generally near the lower end 68 thereof generally between a portion of the inlet conduit 12 and the outer casing 14 thereby forming an annular space 80 generally between the inner liner 16 and the outer casing 14 and an annular space 82 generally between the inner liner 16 and the inlet conduit 12, the annular space 80 and the annular space 82 being in communication via the space between the lower end 68 of the inner liner 16 and the plate 48. The annular space 80 forms an air inlet passageway and the annular space 82 forms an air discharge passageway, the annular space 80 being sometimes referred to below as the air inlet passageway 80 and the annular space 82 being sometimes referred to below as the air discharge passageway 82.

An opening 84 is formed through a portion of the outer casing 14 generally near the upper end 42 thereof and below the connection between the flange portion 76 of the inner liner 16 and the outer casing 14. A blower support 86 having a cavity 88 formed in a portion thereof intersecting one end forming an air outlet opening 90 is secured to the outer peripheral surface of the outer casing 14 generally near the upper end 42 of the outer casing 14. An air inlet opening 92 is formed through a portion of the blower support 86 intersecting a portion of the cavity 88, the air inlet opening 92 communicating with the air outlet opening 90 via the cavity 88. The blower support 86 is, more particularly, secured to the outer casing 14 and positioned such that the opening 84 formed in the outer casing 14 is generally aligned with the air outlet opening 90 of the blower support 86, the air inlet opening 92 being in communication with and forming a portion of the air inlet passageway 80.

The blower assembly 20 also includes a drive assembly 94 connected to an impeller 96 via a shaft 98 and constructed to rotatingly drive the impeller 96 in a driven position of the drive assembly 94, the drive assembly 94 being a prime mover such as an electric motor or the like, in a preferred form. The drive assembly 94 is secured to the outer peripheral surface of the outer casing 14 and the impeller 96 is disposed within a portion of the cavity 88, the interconnecting shaft 98 between the impeller 96 and the drive assembly 94 extending through a shaft opening formed in a portion of the blower support 86, as shown in FIG. 1 and 2.

More particularly, the impeller 96 is positioned within the cavity 88 to receive outside air via the air inlet opening 92 and to force the air through the blower support 86 cavity 88 and through the opening 84 in the outer casing 14, the impeller 96 moving the air through the air inlet passageway 90 in a general direction 100, as indicated via the directional arrows in FIG. 2. The air moving through the air inlet passageway 80 is discharged through the air discharge passageway 82 in a general direction 101, the air discharging through the opening formed between the upper end 32 of the inlet conduit 12 and the adjacent portion of the inner peripheral surface formed via the opening 70 of the inner liner 16. A portion of the air moving through the air discharge passageway 82 is also discharged through the slots 60 formed through the inlet conduit 12 along a general direction 102, as diagrammatically indicated in FIG. 2 with respect to one of the slots 60, the air being discharged in the direction 102 generally within a portion of the effluent inlet passageway 38 near the upper end 32 of the inlet conduit 12, for reasons which will be made more apparent below.

The burner assembly 18 includes a burner conduit 104 having a fuel inlet end 106 and a fuel discharge end 108, as shown more clearly in FIGS. 2 and 3. The burner conduit 104 is generally cylindrically shaped and includes a tapered portion 110 generally near the fuel discharge end 108 thereof forming a relatively narrow, rectangularly shaped fuel discharge opening 112. The fuel inlet end 106 is connectable to a fuel source (not shown) such as a natural or manufactured gas supply or the like via the conduit 113, the burner conduit 104 receiving fuel from the fuel source generally at the fuel inlet end 106 thereof and discharging the fuel via the fuel discharge opening 112, during the operation of the effluent control apparatus 10.

The burner assembly 18 also includes a burner control valve 114 connected to the fuel inlet end 106, as shown in FIG. 1. The fuel source (not shown) is, more particularly, connected to the burner conduit 104 via the fuel control valve 114 interposed in a conduit 113, the fuel control valve 114 having an opened and a closed position for controlling the volume of fuel discharged through the burner conduit 104 in a manner well-known in the art.

A burner opening 116 is formed through a portion of the outer casing 14, a burner opening 118 is formed through a portion of the inner liner 16 and a burner opening 120 is formed through a portion of the inlet conduit 112. In an assembled position of the effluent control apparatus 10, as shown more clearly in FIG. 2, the burner openings 116, 118 and 120 are each aligned and the burner conduit 104 is disposed through the burner openings 116, 118 and 120. The burner conduit 104 is connected to a burner support 122 which is secured to a portion of the outer casing 14 generally near the burner opening 116 therethrough, the burner support 122 thereby securedly supporting the burner conduit 104 in an assembled position. In a supported assembled position of the burner conduit 104, the fuel discharge opening 112 is positioned generally near the burner opening 120 formed in the inlet conduit 12 and disposed in a portion of the effluent inlet passageway 38 generally near the upper end 32 of the inlet conduit 12. The burner conduit 104 is oriented such that fuel received via the conduit 113 at the fuel inlet end 106 is discharged via the fuel discharge opening 112 into a predetermined portion of the effluent inlet passageway 38, in a manner to be described in greater detail below.

An ignition plate 124 is secured to a portion of the burner conduit 104 generally at the fuel discharge end 108 thereof. The ignition plate 124 is disposed near the fuel discharge opening 112 and extends angularly upwardly a predetermined distance generally above the fuel discharge opening 112, as shown more clearly in FIG. 4.

The burner assembly 18 also includes an ignition assembly 126 having one end thereof secured in a portion of the burner support 122 and an ignition rod portion 128 extending angularly through portions of the burner openings 116, 118 and 120. The end of the ignition rod 128, generally opposite the end thereof securedly supported within the burner support 122, is disposed generally near the ignition plate 124. The ignition assemebly 128 is constructed to cause an arc between the end of the ignition rod 128, opposite the end secured to the burner support 122, and an adjacent portion of the ignition plate 124 in an activated position of the igntion assembly 126. The ignition assembly 126 and the ignition plate 124 are disposed such that the arc created or generated therebetween in an activated position of the ignition assembly 126 is interposed in the path of the fuel being discharged via the fuel discharge opening 112 of the burner assembly 18 igniting the fuel and causing a flame within a portion of the effluent inlet passageway 38 spread generally within a flame pattern determined via the shape and the orientation of the fuel discharge opening 112 in a manner and for reasons to be made more apparent below.

Ignition assemblies constructed to create an arc in an activated position thereof for igniting discharging fuel in a manner similar to that described above with respect to the ignition are well-known in the art and commercially available, a detailed description of the construction and operation thereof not being required herein.

The baffle 22 is, in a preferred form, conically shaped having an open upper end 130 and sides tapering toward a closed lower end 132. The baffle 22 is of an expanded metal construction, in one preferred form, and includes a plurality of baffle openings 134 (the baffle openings 134 being designated via a general reference numeral in FIG. 2 for the purpose of clarity of description). In one aspect, the baffle 22 filters larger contaminant or pollutant material contained in the effluent passing therethrough. The size of the baffle openings 134 is thus determined depending upon the effluent and capacity of the effluent control apparatus 10 in a particular operational application, the size and spacing of the baffle openings 134 also determining the volumetric flow per unit of time through the effluent control apparatus 10, for reasons to be made more apparent below.

The baffle 22 is secured to a portion of the inner peripheral surface of the inner liner 16 formed via the opening 70 therethrough generally near the upper end 66 of the inner liner 16. In one form, the diameter of the open upper end 130 is greater than the diameter formed via the opening 70 through the inner liner 16 and the baffle 22 is inserted downwardly through the opening 70 of the inner liner 16 to a position wherein a portion of the baffle 22, generally near the upper end 30, engages an adjacent portion of the inner liner 16, generally near the upper end 66 thereof, securing the baffle 22 in a predetermined assembled position within the opening 70, the baffle 22 being secured in an assembled position via a "force-fit" between the baffle 22 and the inner liner 16 in this one preferred embodiment.

The baffle 22 has a predetermined baffle length 136 sized such that the lower end 132 of the baffle 22 is positioned within a portion of the effluent inlet passageway 38, generally near the fuel discharge opening 112 of the burner conduit 104 and generally near the slots 60 formed through the inlet conduit 12, the contaminated effluent entering the effluent control apparatus 10 via the effluent inlet passageway 36 and being discharged through the baffle openings 134 of the baffle 22 and through the open upper end 24 of the effluent control apparatus 10 during the operation of the effluent control apparatus 10. The conical shape of the baffle 22 permits a larger surface area of the baffle 22 to be disposed in the path of the effluent moving through the effluent control apparatus 10 thereby facilitating greater control of the effluent velocity reduction or increased effluent retention time effected via the baffle 22 since the size and spacing of the baffle openings 134 is not completely controlled or, in other words, is independent to some degree of the diameter 72. The conical shape and accompanying increased baffle 22 surface area also enhances the maintenance of the predetermined temperature level in an area surrounding the heated portion of the baffle 22.

It should be particularly noted that the lower end 132 portion of the baffle 22 is heated via the burner assembly 18 and the baffle length 136 is particularly sized such that the firing chamber is positioned a distance below the upper end 24 of the effluent control apparatus 10. In this manner, the lower end portion 68 of the inner liner 16 is heated to facilitate the preheating of the air moving through the air passageways 80 and 82, yet the upper end 66 portion of the inner liner 16 is maintained at a relatively cooler temperature level, the upper end 66 portion of the inner liner 16 cooperating to cool the effluent discharged via the effluent control apparatus 10 which may be desirable in some applications.

A discharge stack 148, having a lower end 150, an upper end 152 and a stack effluent passageway 154 formed therethrough intersecting the upper and the lower ends 152 and 150, respectively. The lower end 150 of the discharge stack 148 is secured to the upper end 42 of the outer casing 14 and positioned such that the stack effluent passageway 154 is substantially aligned with the effluent inlet passageway 38 and the effluent discharge opening formed via the opening 70 through the inner liner 16, the effluent being discharged through the baffle 22 and through the open upper end 66 of the inner liner 16 and through the stack effluent passageway 154 during the operation of the effluent control apparatus 10.

OPERATION OF FIGS. 1, 2, 3 AND 4

During the operation of the effluent control apparatus 10, the lower end 26 of the inlet conduit 12 is connected to the contaminated effluent source 28 via the conduit 30 for receiving the effluent contaminated with a pollutant, the contaminated effluent being discharged from the contaminated effluent source 28 through the effluent inlet passageway 38 and moving through the effluent control apparatus 10 in a general direction 40. The drive assembly 94 is positioned in a driven position rotatingly driving the impeller 96 moving air through the air inlet opening 92 and through the air inlet passageway 80 generally along an air flow path indicated via the directional arrows 100 in FIG. 2.

The burner control valve 114 is positioned in the opened or partially opened position connecting the burner conduit 104 to the fuel source (not shown) and the ignition assembly 126 is positioned in an activated position. The fuel entering the burner conduit 104 via the conduit 113 connected to the fuel inlet end 106 is mixed with some of the air moving through the air inlet passageway 80, the air entering the burner conduit 104 via the burner air opening 114 interposed in the air inlet passageway 80 and mixing with the fuel. The fuel-air mixture is then discharged via the fuel discharge opening 112, the arc caused via the ignition assembly 126 in the activated position thereof igniting the discharging fuel-air mixture producing a flame.

The burner assembly 18, the lower, closed end portion 132 of the conically shaped baffle 22, and the slots 60 are each positioned within and near the burner assembly 18 flame pattern forming a firing chamber designated in FIG. 2 via the general reference numeral 140. The burner assembly 18 and the blower assembly 20 are each sized and the burner control valve 114 is positioned to pass a predetermined, controlled amount of fuel through the burner conduit 104 such that a flame having a predetermined flame pattern is discharged via the fuel discharge opening 112 generally within the firing chamber 140 elevating the temperature level within the firing chamber 140 to a predetermined temperature level heating the effluent passing through the effluent inlet passageway 38 and through the firing chamber 140 to a predetermined temperature level for combustion of the combustible pollutants and heating a portion of the baffle 22 generally between the lower end 132 and the upper end 130 thereof to a predetermined temperature level for enhancing the combustion of the combustible pollutants within the effluent as the effluent moves through the baffle openings 134 and discharges generally through the upper end 24 of the effluent control apparatus 10. The heating of the baffle 22 to a predetermined temperature level and the disposing of a portion of the baffle 22 within the firing chamber 140 not only enhances the combustion of the combustible pollutants within the contaminated effluent; but, also augments and cooperates with the burner assembly 18 for maintaining a relatively high, predetermined temperature level within the firing chamber 140 during the operation of the effluent control apparatus 10. It should also be noted that some of the combustible pollutants and some of the non-combustible pollutants contained within the contaminated effluent contact the heated portion of the baffle 22 further reducing the percentage content of the pollutants within the contaminated effluent, the baffle 22 thus further cooperating to reduce the pollutant content of the effluent passing through the effluent control apparatus 10 and being discharged therefrom.

In one preferred form, the burner assembly 18 and the baffle 22 are disposed such that the firing chamber 140 is located a distance generally below the upper end 24 of the effluent control apparatus 10 so that the upper end 66 portion of the inner liner 16 is maintained at a cooler temperature level with respect to the lower end 68 portion near the burner assembly 18. In this manner the discharging effluent is cooled to some degree via the relatively cooler upper end 66 portion of the inner liner 16 prior to being discharged from the effluent control apparatus 10, the blower assembly 20 being positioned near the upper end 66 portion of the inner liner 16 so that the air moved into the air inlet passageway 80 via the blower assembly 20 cooperates to maintain the relatively lower temperature level of the upper end 66 portion while the heated lower end portion 68 of the inner liner 16 acts to preheat the air moving through the air passageways 80 and 82.

The blower assembly 20 moves air through the air inlet passageway 80 and through the air discharge passageway 82 in a driven position thereof. The lower end 66 portion of the inner liner 16 is heated via the heat generated within the firing chamber 140 and heats or, more particularly, preheats the air moving through the air inlet passageway 80. The preheated air is discharged through the air discharge passageway 82 near the upper end 32 of the inlet conduit 12 and the discharging preheated air intimately contacts the effluent generally within the firing chamber 140 enhancing the combustion of the pollutants. It should also be noted that the air discharge passageway 82 is shaped and positioned such that the air is discharged therefrom in a direction indicated via the directional arrow 101 in FIG. 1 substantially corresponding to the direction of the effluent flow moving through the effluent control apparatus 10 or, in other words, in a direction substantially parallel to the direction of flow of the effluent through the effluent control apparatus 10, the preheated discharging air also acting to pull the effluent through the effluent inlet passageway 38, through the firing chamber 140 and through the baffle openings 134 of the baffle 22.

As mentioned before, a portion of the air moving through the air passageways 80 and 82 is discharged in a general direction 102 through the slots 60 formed in the inlet conduit 12 and thus a portion of the air moving through the air passageways 80 and 82 intimately contacts the contaminated effluent and the flame discharged via the burner assembly 18 generally near the lower end 132 of the baffle 22. The mixing of a portion of the air passing through the air passageways 80 and 82 with the contaminated effluent generally near the lower end 132 of the baffle 22 enhances and increases the combustion of the combustible pollutants contained within the contaminated effluent as the contaminated effluent is moved through the effluent control apparatus 10.

The shape, orientation and disposition of the baffle 22 interposed in the path of the effluent and having a portion disposed in the firing chamber 140 acts to reduce the velocity of the effluent moving through the effluent control apparatus 10 and, more particularly, reduces the velocity of the effluent moving through the firing chamber 140. The baffle 22 thus effectively increases the retention time of the contaminated effluent within the firing chamber 140, enhancing the mixing of the air and the effluent and enhancing the combustion of the combustible pollutants thereby further reducing the pollutant content of the effluent discharged from the effluent control apparatus 10. As mentioned before, the heated baffle 22 also cooperates to retain heat within the firing chamber 140 thereby cooperating to maintain the predetermined temperature level within the firing chamber 140 during the operation of the effluent control apparatus 10.

In one operational embodiment of the present invention the effluent control apparatus 10 was connected to a refuse incinerator constructed for burning cardboard, plastic, wood and other such waste products from a supermarket, this particular incinerator being constructed and having a capacity for burning refuse at a rate of approximately 300 pounds per hour. In this particular example, the inlet conduit 12 had a 20 inch outside diameter 26 and the outer casing 14 had a 32 inch outside diameter (corresponding to the inside diameter 54 plus twice the thickness of the outer casing 14). The length of the outer casing 14 generally from the lower end 44 to the upper end 24 was approximately 48 inches; the width or thickness of the refractory inner liner 16 was approximately three inches; the spacing between the outer peripheral surface of the inner liner 16 and the inner peripheral surface formed via the opening 46 through the outer casing 14 was approximately three inches; and the spacing between the inner peripheral surface formed via the opening 70 through the inner liner 16 and the outer peripheral surface of the inlet conduit 12 was approximately one inch.

In this particular operational embodiment of the effluent control apparatus 10, the baffle 22 was of an expanded metal construction and the slots 60 were sized to pass approximately ten percent of the air moving through the air inlet passageway 80 during the operation of the effluent control apparatus 10. The drive assembly 94 utilized in this operational embodiment was a one and one-half horsepower electric motor and a temperature level of approximately fourteen hundred (1400)° Fahrenheit was maintained within the firing chamber 140.

During the operation of the one operational embodiment of the effluent control apparatus 10, described above, approximately three hundred (300) pounds of refuse per hour were burned in the incinerator (contaminated effluent source 28) and the resulting effluent was connected to the effluent inlet passageway 38 and moved through the effluent control apparatus 10. The burner assembly 18 burned or utilized approximately four hundred fifty (450) cubic feet of natural gas per hour during this particular test operation. The effluent control apparatus 10 was tested under these conditions for a two hour period of time and the pollutant content of the effluent discharged from the effluent control apparatus 10 was tested and monitored to determine the grains per dry cubic foot of effluent discharged from the effluent control apparatus 10, the test results showing that the pollutant content of the effluent discharged from the effluent control apparatus 10 was approximately 0.0077 grains per dry cubic foot of effluent discharged from the effluent control apparatus 10. It was determined that the effluent control apparatus 10 not only effectively substantially reduced the pollutant content of the contaminated effluent passing therethrough; but, the effluent control apparatus 10 also reduced the pollutant content of the effluent passing therethrough to a tested level substantially below the maximum generally required via one of the governmental agencies (the maximum pollutant content being 0.20 grains per dry cubic foot of effluent discharged in this one particular test application).

EMBODIMENT OF FIGS. 5 AND 6

Shown in FIGS. 5 and 6 is a modified effluent control apparatus 10a constructed exactly like the effluent control apparatus 10, but having a modified discharge stack 148a. The lower end 150a of the discharge stack 148a is secured to the upper end 42 of the outer casing 14 and positioned such that the stack effluent passageway 154a is substantially aligned with the effluent inlet passageway 38 and the effluent discharge opening formed via the opening 70 through the inner liner 16, the effluent being discharged through the baffle 22 and through the open upper end 66 of the inner liner 16 and through the stack effluent passageway 154a during the operation of the effluent control apparatus 10a. The pollutant content of the effluent discharged from the stack effluent passageway 154a, generally at the upper end 152a thereof, is substantially reduced as a result of the effluent passing through the firing chamber 140 and through the baffle 22 in a manner as described before with respect to the effluent control apparatus 10.

The discharge stack 148a includes a cylindrically shaped outer shell 156 securedly connected to a cylindrically shaped inner shell 158 and spaced a predetermined distance therefrom forming an enclosed annular heating space 160 therebetween, as shown in FIGS. 5 and 6. The annular heating space 160 thus extends between the inner and the outer shells 158 and 156, respectively, and between the upper and the lower ends 152a and 150a of the discharge stack 148a, the heating space 160 being disposed generally adjacent and surrounding the stack effluent passageway 154a. A portion 161 of the inner shell 158 is tapered radially outwardly generally at the lower end 150a of the discharge stack 148a.

An inlet opening 162 is formed through the outer shell 156 intersecting and communicating with a portion of the heating space 160 and an outlet opening 164 is formed through the outer shell 156 intersecting and communicating with a portion of the annular heating space 160. The inlet opening 162 is spaced a predetermined distance from the outlet opening 164 and a wall 166 is disposed within the annular heating space 160 generally between the inlet opening 162 and the outlet opening 164. The wall 166, more particularly, extends between and is connected to the upper and the lower ends 152a and 150a of the discharge stack 148a, and the wall 166 extends between and is connected to the outer shell 156 and the inner shell 158.

The inlet opening 162 is connected via a conduit 168 to a gas source 170 which, in one preferred form, is an air supply source or the like such as generally associated with a central heating system for a house, an office or other such building structure, for example. The outlet opening 164 is connected to a heated gas system 174 via a conduit 176. The gas source 170 and the heated gas system 174 each cooperate, in one preferred operational embodiment of the present invention as shown in FIGS. 5 and 6, to provide a portion of a central heating system, in one operational embodiment mentioned before, the effluent control apparatus 10a cooperating to provide heated gas such as air or the like, for example, to the heated gas system 174 simultaneous with the operation of the effluent control apparatus 10a to reduce the pollutants contained in the effluent flowing therethrough.

During the operation of the effluent control apparatus 10a, as shown in FIGS. 5 and 6, the pollutant content of the effluent flowing through the effluent control apparatus 10 is reduced in a manner exactly like that described before with respect to the effluent control apparatus 10 shown in FIGS. 1, 2, 3 and 4, and the effluent is discharged through the stack effluent passageway 154a. As the effluent passes through the firing chamber 140, the effluent is heated to a predetermined temperature level, as mentioned before, and the effluent discharged through the stack effluent passageway 154a thus has an increased heat energy or temperature level with respect to the heat energy or temperature level of the effluent received from the contaminated effluent source 28.

Gas, such as air or the like, is forced through the inlet opening 162 into the heating space 160 via the gas source 170, the gas entering the inlet opening 162 being at a first or an initial predetermined temperature level. The gas from the gas source 170 is moved through the heating space 160 generally about the stack effluent passageway 154a along a flow path indicated via the general direction arrows 175 diagrammatically shown in FIG. 6, the gas being discharged through the outlet opening 164 and connected to the heated gas system 174 via the conduit 176. As the gas is moved along the flow path in the direction 175, about the stack effluent passageway 154a, the temperature level of the gas is elevated via the heated effluent moving through the stack effluent passageway 154a and thus the gas discharged through the outlet opening 164 has an elevated second temperature level greater than the first temperature level of gas entering the heating space 160, the heated gas being connected to and utilized via the heated gas system 174. Thus, the effluent control apparatus 10a, shown in FIGS. 5 and 6, is constructed to reduce the percentage of pollutants within the effluent discharged via the effluent control apparatus 10a and simultaneously utilize the heat energy imparted to the effluent for heating gas received from the gas source 170, thereby providing what may be referred to as a secondary recovery of a portion of the heat energy imparted to the effluent during the operation of the effluent control apparatus 10a which may be desirable in some applications.

Changes may be made in the construction and the arrangement of the parts or the elements of the various embodiments as disclosed herein without departing from the spirit and the scope of the invention as defined in the following claims.

What is claimed is:

1. An effluent control apparatus for receiving an effluent contaminated with a pollutant, comprising:

an inlet conduit, having an upper end, a lower end, and an effluent inlet passageway formed therethrough;

a baffle having baffle openings and a portion disposed near the upper end of the inlet conduit;

means engaging the baffle and supporting the baffle, a portion of the baffle being supported generally near the upper end portion of the inlet conduit;

a burner assembly, having a portion disposed near a portion of the effluent inlet passageway and near a portion of the baffle discharging a flame in an operating position of the burner assembly, the flame heating a portion of the effluent inlet passageway and a portion of the baffle to a predetermined temperature level, and the contaminated effluent moving through the effluent inlet passageway in a direction generally from the lower end toward the upper end of the inlet conduit and being discharged through the baffle openings in an operating position of the effluent control apparatus;

an outer casing, having an upper end, a lower end and an opening extending therethrough, a portion of the inlet conduit near the upper end thereof being disposed within a portion of the outer casing opening near the lower end of the outer casing, the lower end portion of the inlet conduit being connected to the outer casing and the upper end of the inlet conduit being spaced a distance below the upper end of the outer casing;

means having a portion disposed between the upper end portion of the inlet conduit and the outer casing and spaced a distance from the inlet conduit forming an air passageway between the upper end portion of the inlet conduit and said means for receiving air or the like and discharging the received air or the like generally near the upper end of the inlet conduit in a direction generally parallel with the direction of flow of the effluent through the effluent inlet passageway; and means in communication with the air passageway discharging air or the like into the air passageway, the air or the like moving through the air passageway and being discharged generally near the upper end of the inlet conduit, the air and the effluent discharging through the baffle openings in an operational position of the effluent control apparatus.

2. The apparatus of claim 1 wherein the means having a portion disposed between the inlet conduit and the outer casing forming the air passageway is defined further to include:

an inner liner, having an upper end, a lower end, an opening extending therethrough and a portion disposed within the outer casing opening, a portion of the inlet conduit near the upper end of the inlet conduit being disposed within a portion of the opening through the inner liner, the inner liner being connected to the outer casing generally near the upper end portion of the inner liner, the inner liner being spaced from the outer casing, spaced from the inlet conduit and the lower end of the inlet conduit being spaced a distance above the connection between the outer casing and the inlet conduit forming an air passageway for discharging air or the like near the upper end of the inlet conduit in a direction generally parallel with the direction of flow of the effluent through the effluent inlet passageway.

3. The apparatus of claim 1 wherein the means discharging air or the like into the air passageway is defined further to include:

a blower assembly, having a portion in communication with the air passageway, discharging air or the like into the air passageway in a driven position of the blower assembly, the blower assembly being disposed near the upper end portion of the inner liner; and wherein the burner assembly is defined further as being disposed near the lower end portion of the inner liner, the air or the like moving through the air passageway cooling the upper end portion of the inner liner and the heated lower end portion of the inner liner preheating the air or the like.

4. The apparatus of claim 1 wherein the outer casing includes a burner opening, the inner liner includes a burner opening and the inlet conduit includes a burner opening, the burner openings in the inner liner, the outer casing and the inlet conduit being substantially aligned; and wherein the burner assembly includes a fuel inlet end and a fuel outlet end, a portion of the burner assembly being disposed through the aligned burner openings, the fuel inlet end portion of the burner assembly being connected to a portion of the outer casing and supported thereby, and the fuel discharge end portion of the burner assembly being disposed near the burner opening in the inlet conduit for discharging a flame into a predetermined portion of the effluent inlet passageway in an operating position of the burner assembly.

5. The apparatus of claim 1 wherein the inner liner includes a flange portion formed on the upper end thereof extending radially outwardly and circumferentially about a portion of the inner liner, the outer peripheral surface formed via the flange portion on the inner liner being securely connected to the outer casing generally near the upper end of the outer casing supporting the inner liner within the opening formed through the outer casing, the lower end of the inner liner spaced a distance above the lower end of the casing and the spacing forming a portion of the air passageway.

6. The apparatus of claim 1 wherein the inlet conduit includes slots formed therethrough near the upper end thereof intersecting the effluent inlet passageway and providing communication between a portion of the air passageway and the effluent inlet passageway, some of the air or the like discharging into the effluent inlet passageway via the slots during the operation of the effluent control apparatus.

7. The apparatus of claim 1 wherein the baffle is defined further as being conically shaped having an open upper end and walls tapering to a closed lower end, a portion of the baffle near the closed lower end thereof being disposed within a portion of the effluent inlet passageway near the upper end of the inlet conduit and near a portion of the burner assembly, the heating of a portion of the baffle via the burner assembly facilitating the maintenance of a predetermined temperature level within a portion of the effluent inlet passageway during the operation of the effluent control apparatus.

8. The apparatus of claim 7 wherein the baffle and the baffle openings reduce the velocity of the effluent passing therethrough increasing the effluent retention time within the heated portion of the effluent inlet passageway during the operation of the effluent control apparatus.

9. The apparatus of claim 1 defined further to include:
a discharge stack, having an upper end, a lower end, a stack effluent passageway formed therethrough, and an enclosed heating space surrounding a portion of the stack effluent passageway;
means in communication with the heating space and discharging the gas into a portion of the heating space at a first temperature level; and
means in communication with the heating space and discharging the gas from the heating space, the gas being heated to a second temperature level elevated with respect to the first temperature level via the heat of the effluent passing through the stack effluent passageway in an operating position of the effluent control apparatus.

* * * * *